Dec. 30, 1930.  R. E. BISSELL  1,786,596
VALVE WITH REMOVABLE RING SEATING SURFACE
Filed Feb. 9, 1928
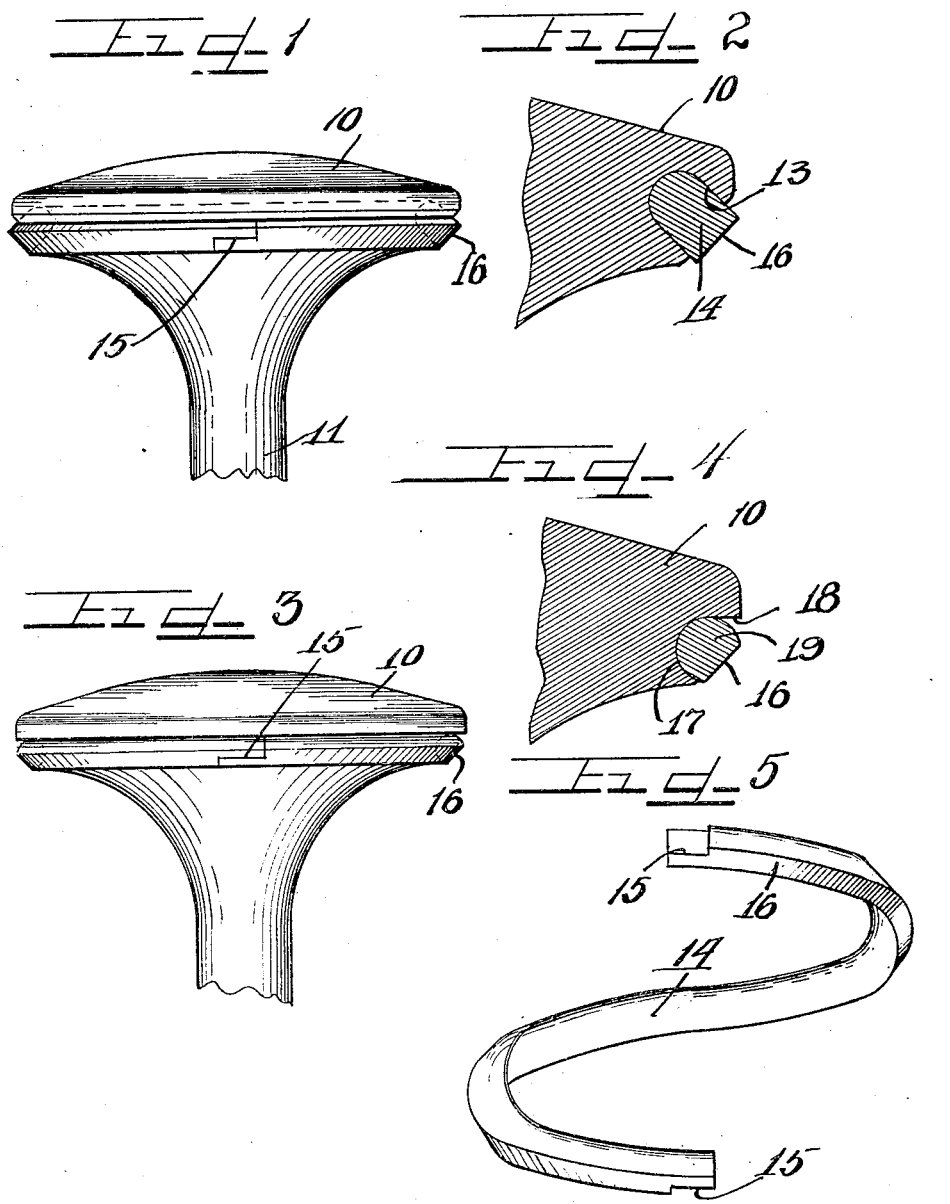

Patented Dec. 30, 1930

1,786,596

UNITED STATES PATENT OFFICE

RICHARD E. BISSELL, OF CLEVELAND, OHIO, ASSIGNOR TO THOMPSON PRODUCTS, INC., A CORPORATION OF OHIO

VALVE WITH REMOVABLE RING SEATING SURFACE

Application filed February 9, 1928. Serial No. 253,139.

This invention relates to valves for internal combustion engines and has special reference to poppet valves having renewable frustroconical seating surfaces.

It is the general object of this invention to provide a renewable seating face for poppet valves that will seal as tightly as normal valves and that can be replaced when worn or leaking without requiring the removal of the valves, springs and spring retainers from the cylinder block or head, as the case may be.

It is also an object of this invention to provide a renewable valve seating face so mounted on the valve as to have a limited range of angular motion to assure surface rather than line contact with a valve seat reamed or worn to an angle somewhat varying from the desired angle.

It is another object of this invention to form a split valve seating face ring so mounted in a groove as to expand in a direction normal to the angle of the corresponding seating surface.

It is still another object of this invention to provide a split ring of the type described having a lap joint at the split, the ring being initially formed as a helix in a direction such that when seated, the lap joint will be pressed firmly together.

Other and further important objects of this invention will be apparent from the disclosures in the specification and accompanying drawings.

This invention (in a preferred form) is illustrated in the drawings and hereinafter more fully described.

Figure 1 is a fragmentary elevation of a poppet valve head embodying the features of this invention.

Figure 2 is a fragmentary enlarged section through the seating surface.

Figure 3 is a fragmentary elevation of a valve head embodying a modified form of this invention.

Figure 4 is a fragmentary enlarged section of the modified form of Figure 3.

Figure 5 is a side elevation of a free valve seat ring.

As shown on the drawings:

A poppet valve head 10 and a portion of a valve stem 11 has been indicated, the particular form of the top of the head and the neck connecting the head and stem having no bearing on the present invention. The angle of the valve seat portion is usually 30° or 45° and in the first illustrated embodiment of my invention, I provide a parallel walled groove 13 in the seat portion having a semicircular bottom, the side walls of the groove being normal to the angle of the valve seat.

A split ring 14 having overlapping notched ends 15 is sprung into place in the groove, the ring being formed to be a close fit in the groove because it is not expected to move therein during normal operation, the ring differing in this respect from a piston ring which is designed to expand. The ring 14 is initially formed as a helix, as shown in Figure 5, with the overlapping ends displaced in a direction opposite to the overlapped position of the notched ends. This ring 14 should be made of a material maintaining its strength at the normal operating temperature of the valve. In general, any valve alloy or steel suitable for a solid valve in a given application will be satisfactory for the ring, but for extremely severe operating conditions, as in aeroplane engines, it is desirable to use the highest quality of valve alloys, a specific example of which is the chrome-nickel-silicon alloy disclosed in my copending application, Serial No. 163,315, filed January 24, 1927.

It will be evident that the projecting outer face 16 of the ring forms the valve seating surface and is intended to project beyond the face of the valve head. The valve head is therefore appreciably smaller in diameter and lighter in weight than a corresponding solid valve, an important consideration due to the decreased load on the valve operating mechanism.

In Figures 3 and 4, the groove 17 in the head is formed as an outline of a cylinder with the upper wall 18 a plane surface perpendicular to the axis of the valve and tangent to the cylinder. In this case, the ring 19 is formed with a cylindrical section slightly flattened to the proper angle on the surface forming the valve face 16. With this form of groove and ring, the ring can adjust itself to the valve seat by twisting or rolling in the groove so that the valve is self-seating to compensate for errors in the formation or wear of the valve seat in the engine block or head, as the case may be.

The ring of this invention can be assembled on a valve while in position in a cylinder block by slipping the spaced ends about the stem of the valve and springing the ring into the groove in the head, so that old and worn seats can be replaced in an engine without disassembly of other parts and without requiring regrinding.

I am aware that many changes may be made, and numerous details of construction may be varied through a wide range without departing from the principles of this invention, and I therefore do not purpose limiting the patent granted hereon, otherwise than necessitated by the prior art.

I claim as my invention:

1. A valve having a groove in the face portion thereof, and a split ring having overlapping ends and seating in said groove, said ring being initially formed as a helix whereby sealing pressure will be applied to the split when said ring is seated in said groove.

2. A valve having a semicircular bottomed groove in the face portion thereof, and a split ring having overlapping ends and seating in said groove, said ring being initially formed as a helix whereby sealing pressure will be applied to the split when said ring is seated in said groove.

3. A valve having a groove in the seating portion thereof and a renewable split ring seated in said groove and adapted to form the valve face thereof, the ends of said ring being initially offset from each other whereby sealing pressure will be applied to the split when said ends are brought into engagement.

4. A valve seating surface comprising a split ring of high temperature resistant steel having spring-like characteristics, said ring being initially formed with its ends lying in different horizontal planes.

5. A valve seating surface comprising a split ring having overlapping ends, the ring being initially formed with its ends offset in the direction of the overlapping faces of the ends whereby when the ring is compressed into a plane, the overlapping ends will press upon each other.

6. A valve seating surface comprising a split ring having overlapping ends, said ring being initially formed with the ends overlying each other laterally whereby sealing pressure will be exerted against said ends when they are brought into overlapping engagement.

7. As a new article of manufacture, a device for use as a valve seating surface, comprising a split ring having the form of a helix, the ends of said ring having complementary notched surfaces whereby when the ends are placed in overlapping relation they form a lap joint.

8. A valve having a semi-circular bottomed groove in the seating portion thereof and a seating surface comprising a renewable split ring having a surface complementary to the contour of said groove, positioned in said groove, whereby said ring can roll in said groove and thereby adjust itself on the valve seat.

In testimony whereof I have hereunto subscribed my name.

RICHARD E. BISSELL.